United States Patent
Pearson et al.

(10) Patent No.: US 11,001,396 B2
(45) Date of Patent: May 11, 2021

(54) AIRFIELD GUIDANCE SIGNS

(71) Applicant: HONEYWELL INTERNATIONAL INC., Morris Plains, NJ (US)

(72) Inventors: John Taylor Pearson, Morris Plains, NJ (US); Yogendra Yogi Sheoran, Morris Plains, NJ (US); Ramalingam Nallur, Morris Plains, NJ (US); Don Reginald Holcomb, Jr., Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/462,575

(22) PCT Filed: Nov. 17, 2017

(86) PCT No.: PCT/US2017/062270
§ 371 (c)(1),
(2) Date: May 21, 2019

(87) PCT Pub. No.: WO2018/094196
PCT Pub. Date: May 24, 2018

(65) Prior Publication Data
US 2020/0079526 A1     Mar. 12, 2020

Related U.S. Application Data

(60) Provisional application No. 62/424,881, filed on Nov. 21, 2016.

(51) Int. Cl.
*B64F 1/00* (2006.01)
*G09F 15/00* (2006.01)
*G08G 5/00* (2006.01)

(52) U.S. Cl.
CPC .......... *B64F 1/002* (2013.01); *G09F 15/0087* (2013.01); *G08G 5/0026* (2013.01)

(58) Field of Classification Search
CPC ....... B64F 1/002; G08G 5/0026; G09F 15/00; G09F 15/0006
See application file for complete search history.

(56) References Cited

U.S. PATENT DOCUMENTS

| | | | | |
|---|---|---|---|---|
| 3,646,696 A * | 3/1972 | Sarkisian | ................ | G09F 7/002 40/602 |
| 4,369,591 A * | 1/1983 | Vicino | .................... | G09F 19/00 40/214 |
| 4,878,303 A * | 11/1989 | Banniza | .................... | G09F 7/20 40/606.14 |
| 6,240,666 B1 * | 6/2001 | Apel | .................. | G09F 15/0025 40/602 |
| 8,156,672 B2 * | 4/2012 | Xu | ........................ | G05B 19/042 40/473 |

(Continued)

*Primary Examiner* — Gary C Hoge
(74) *Attorney, Agent, or Firm* — Brooks, Cameron & Huebsch, PLLC

(57) ABSTRACT

Airfield guidance signs are described herein. One airfield guidance sign includes a first surface, a second surface angled with respect to the first surface, and a top edge adjacent the first surface and the second surface, wherein the top edge is rounded to reduce a pressure differential between the first surface and the second surface when a force is applied to the first surface or the second surface.

11 Claims, 5 Drawing Sheets

(56) References Cited

U.S. PATENT DOCUMENTS

| | | | |
|---|---|---|---|
| 2006/0086021 A1* | 4/2006 | Stephenson | G09F 13/04 40/564 |
| 2011/0000011 A1* | 1/2011 | Gebka | G09F 15/00 4/321 |
| 2014/0290104 A1* | 10/2014 | Lindblom | G09F 15/0025 40/559 |

* cited by examiner

AIRFIELD GUIDANCE SIGNS

TECHNICAL FIELD

The present disclosure relates to airfield guidance signs.

BACKGROUND

Airfield guidance signs are used to direct aircraft ground traffic at an airport. For example, airfield guidance signs may provide navigational information (e.g., in the form of letters, numbers, and/or arrows) to aircraft (e.g., to the pilots of the aircraft) travelling along the runways, approach areas, and/or taxiways of the airport.

To effectively direct aircraft ground traffic, airfield guidance signs need to be located close by the paths along which the aircraft ground traffic travels, so that the signs (e.g., the navigational information provided by the signs) are visible to the pilots of the aircraft. However, this close proximity to the aircraft can result in damage to the signs, caused by jet blast and/or wake turbulence forces that may occur as the aircraft pass by the signs. Such damage may occur more frequently, and/or may be more severe, when large aircraft, such as, for instance, A380 and/or B747 jets, are passing by the signs.

DETAILED DESCRIPTION

Figure 1:
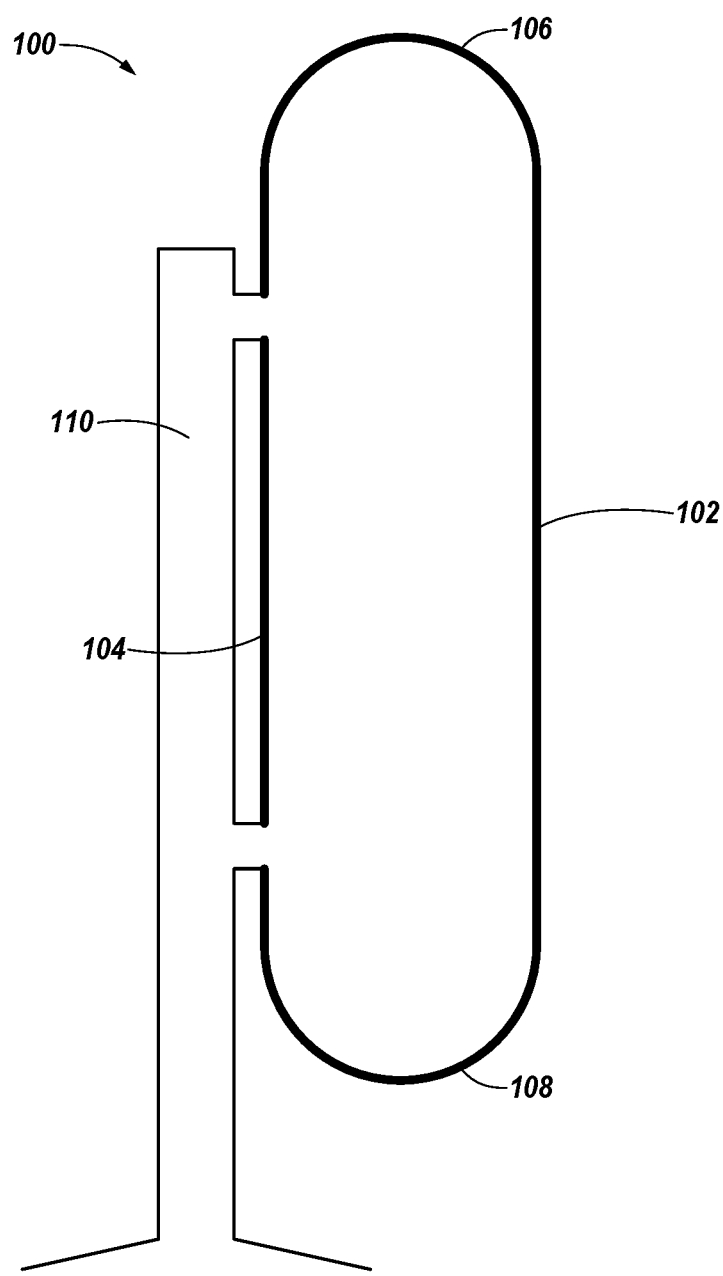
FIG. 1 illustrates a side view of an airfield guidance sign in accordance with one or more embodiments of the present disclosure.

Airfield guidance signs are described herein. For example, one or more embodiments include a first surface, a second surface angled with respect to the first surface, and a top edge adjacent the first surface and the second surface, wherein the top edge is rounded to reduce a pressure differential between the first surface and the second surface when a force is applied to the first surface or the second surface.

Airfield guidance signs in accordance with the present disclosure may be damaged less frequently and/or less severely than previous airfield guidance signs. For example, airfield guidance signs in accordance with the present disclosure may be damaged less frequently and/or less severely than previous airfield guidance signs by jet blast and/or wake turbulence forces caused by aircraft passing by the signs, including jet blasts and/or wake turbulence forces caused large aircraft such as A380 and B747 jets.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of support structures" can refer to one or more support structures.

FIG. 1 illustrates a side view of an airfield guidance sign 100 in accordance with one or more embodiments of the present disclosure. Airfield guidance sign 100 can be used to direct aircraft ground traffic at an airport. For example, airfield guidance sign 100 can be located (e.g., installed) adjacent to a runway, approach area, or taxiway of an airport.

As shown in FIG. 1, airfield guidance sign 100 can include a first surface (e.g., face) 102, and a second surface (e.g., face) 104 opposite (e.g., parallel to) first surface 102. First surface 102 can be, for example, the front (e.g., forward) surface of airfield guidance sign 100, and second surface 104 can be, for example, the back (e.g., aft) surface of airfield guidance sign 100.

First surface 102 can include (e.g., display thereon) navigational information, such as, for instance, numbers, letters, and/or arrows. This information can be visible to the aircraft (e.g. to the pilots of the aircraft) travelling along the runways, approach areas, and/or taxiways of the airport, and can be used by the pilots to navigate along the runways, approach areas, and/or taxiway, as will be appreciated by one of skill in the art.

As shown in FIG. 1, airfield guidance sign 100 can include a number of (e.g., at least one) rounded edges. For example, in the embodiment illustrated in FIG. 1, airfield guidance sign 100 includes rounded edges 106 and 108. Rounded edge 106 can be the top edge of airfield guidance sign 100 (e.g., the edge of the sign adjacent first surface 102 and second surface 104 at the top of the sign), and rounded edge 108 can be the bottom edge of airfield guidance sign 100 (e.g., the edge of the sign adjacent first surface 102 and second surface 104 at the bottom of the sign), as illustrated in FIG. 1.

Further, although not shown in FIG. 1 for clarity and so as not to obscure embodiments of the present disclosure, in some embodiments the side edges of airfield guidance sign 100 (e.g., the edges of the sign adjacent first surface 102 and second surface 104 on each respective side of the sign) may also be rounded. For instance, in some embodiments, each edge of airfield guidance sign 100 (e.g., top edge 106, bottom edge 108, and the side edges) may be rounded.

The rounded edges of airfield guidance sign 100 (e.g., rounded edges 106 and 108 illustrated in FIG. 1) can reduce a pressure differential between first surface 102 and second surface 104 when a force, such as, for instance, a jet blast and/or wake turbulence force caused by an aircraft passing by airfield guidance sign 100, is applied to first surface 102 or second surface 104. For example, as an aircraft passes by airfield guidance sign 100, the jet blast and/or wake turbulence forces caused by the passing aircraft may apply a high amount of pressure to one of the surfaces (e.g., first surface 102 or second surface 104) of the sign, while a recirculation zone may occur on the opposite side of the sign, which may create a low pressure vacuum on the opposite surface of the sign. As a result, there may be a pressure difference between the two surfaces when the aircraft passes by the sign.

This pressure differential, however, can be reduced by the rounded edges of airfield guidance sign 100. For example, the rounded edges may turn the approaching air flow of the jet blast and/or wake turbulence force more smoothly than if the edges were sharp (e.g., square). This smoother air flow turn may result in a greater pressure equilibrium between the two surfaces of airfield guidance sign 100, which in turn may reduce the pressure difference between the two surfaces.

By reducing the pressure differential between first surface 102 and second surface 104 when such a force is applied to one of the surfaces, the rounded edges of airfield guidance sign 100 can reduce the frequency and/or severity of damage that such forces may cause to the sign. For example, airfield guidance sign 100 may be damaged less frequently and/or less severely by such forces than previous airfield guidance signs, such as, for instance, airfield guidance signs with sharp (e.g., square) edges.

As shown in FIG. 1, airfield guidance sign 100 can include a support structure (e.g., leg) 110 coupled to second surface 104. Although one support structure is illustrated in FIG. 1, embodiments of the present disclosure are not so limited (e.g., airfield guidance sign 100 can include any number of support structures coupled to second surface 104).

Further, in some embodiments, airfield guidance sign 100 can include a number of support structures coupled to the bottom of the sign (e.g., instead of to second surface 104). For instance, in some embodiments, airfield guidance sign 100 can include a number of support structures coupled to bottom edge 108. Examples of airfield guidance signs with support structures coupled to the bottom of the sign will be further described herein (e.g., in connection with FIGS. 2A-2B and 3A-3B).

Figure 2A:
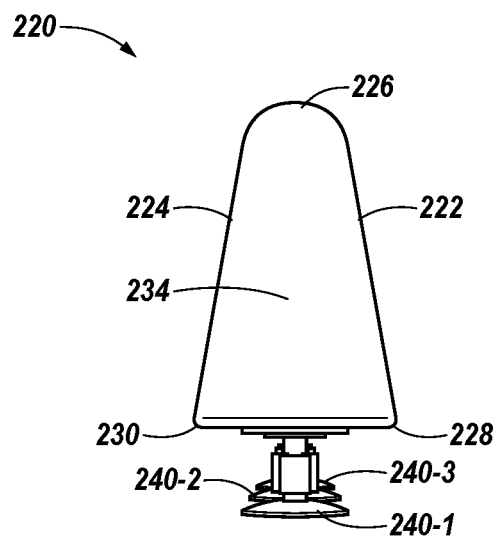
FIGS. 2A-2B illustrate various views of an airfield guidance sign in accordance with one or more embodiments of the present disclosure.
Figure 2B:
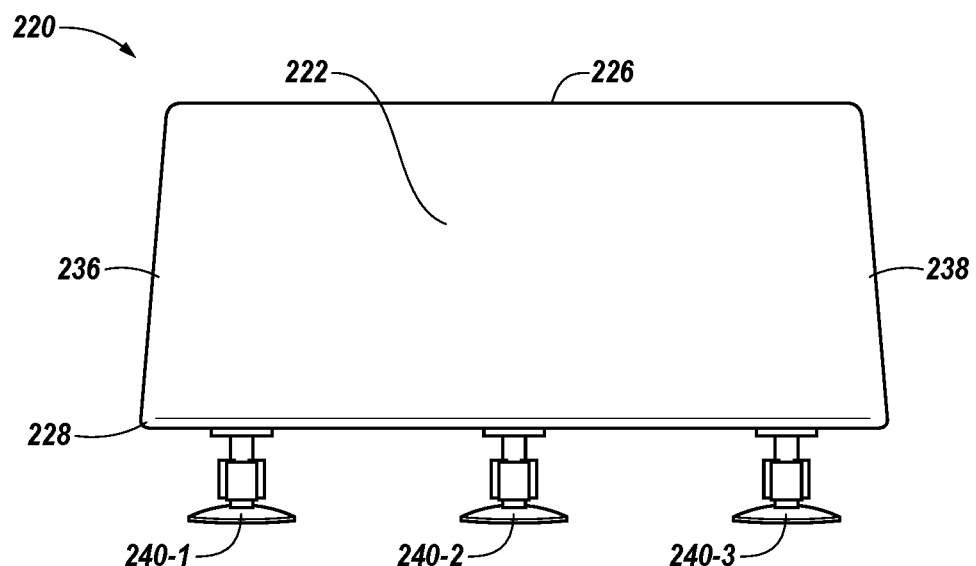

FIGS. 2A-2B illustrate various views of an airfield guidance sign 220 in accordance with one or more embodiments of the present disclosure. For example, FIG. 2A illustrates a side view of airfield guidance sign 220, and FIG. 2B illustrates a front view of airfield guidance sign 220. Airfield guidance sign 220 can be used to direct aircraft ground traffic at an airport, in a manner analogous to airfield guidance sign 100 previously described in connection with FIG. 1.

As shown in FIGS. 2A-2B, airfield guidance sign 220 can include a first surface (e.g., face) 222, and a second surface (e.g., face) 224 angled with respect to first surface 222. First surface 222 can be, for example, the front (e.g., forward) surface of airfield guidance sign 220, and second surface 224 can be, for example, the back (e.g., aft) surface of airfield guidance sign 220. First surface 222 can include (e.g., display thereon) navigational information, such as, for instance, numbers, letters, and/or arrows, in a manner analogous to first surface 102 of airfield guidance sign 100 previously described in connection with FIG. 1.

In some embodiments, second surface 224 may be angled with respect to first surface 222 at an angle of forty degrees or less (e.g., each respective surface 222 and 224 may have an angle of twenty degrees or less with respect to vertical). For instance, forty degrees may be the greatest possible angle at which second surface 224 may be angled with respect to first surface 222 for the navigational information displayed on first surface 222 to be visible to the aircraft (e.g., to the pilots of the aircraft) travelling along the runways, approach areas, and/or taxiways of the airport (e.g., the navigational information may not be visible to the aircraft if this angle is greater than forty degrees).

As shown in FIGS. 2A-2B, airfield guidance sign 220 can include a number of (e.g., at least one) rounded edges. For example, in the embodiment illustrated in FIGS. 2A-2B, airfield guidance sign 220 includes rounded edges 226, 228, 230, 236, and 238. Rounded edge 226 can be the top edge of airfield guidance sign 220 (e.g., the edge of the sign adjacent first surface 222 and second surface 224 at the top of the sign), as illustrated in FIGS. 2A-2B.

Rounded edges 228 and 230 can be the bottom edges of airfield guidance sign 220, as illustrated in FIGS. 2A-2B. For example, rounded edge 228 can be the bottom edge of airfield guidance sign 220 adjacent first surface 222 (e.g., the edge of the sign adjacent first surface 222 at the bottom of the sign), and rounded edge 230 can be the bottom edge of airfield guidance sign 220 adjacent second surface 224 (e.g., the edge of the sign adjacent second surface 224 at the bottom of the sign), as illustrated in FIGS. 2A-2B.

Rounded edges 236 and 238 can be side edges of airfield guidance sign 220, as illustrated in FIGS. 2A-2B. For example, rounded edge 236 can be the side edge of airfield guidance sign 220 adjacent first surface 222 on first side 234 of airfield guidance sign 220, and rounded edge 238 can be the side edge of airfield guidance sign 220 adjacent first surface 222 on the second side of airfield guidance sign 220 that is opposite first side 234 (not shown in FIGS. 2A-2B), as illustrated in FIGS. 2A-2B. Further, although not shown in FIGS. 2A-2B for clarity and so as not to obscure embodiments of the present disclosure, airfield guidance sign 220 can include an additional rounded side edge adjacent second surface 224 on first side 234 of airfield guidance sign 220, and an additional rounded side edge adjacent second surface 224 on the second side of airfield guidance sign 220.

Although each edge of airfield guidance sign 220 is rounded in the embodiment illustrated in FIGS. 2A-2B, embodiments of the present disclosure are not so limited. For example, in some embodiments, bottom edges 228 and 230 may not be rounded.

The rounded edges of airfield guidance sign 220 can reduce a pressure differential between first surface 222 and second surface 224 when a force, such as, for instance, a jet blast and/or wake turbulence force caused by an aircraft passing by airfield guidance sign 220, is applied to first surface 222 or second surface 224. For example, there may be a pressure difference between the two surfaces of airfield guidance sign 220 when the aircraft passes by the sign, in a manner analogous to that previously described in connection with airfield guidance sign 100.

This pressure differential, however, can be reduced by the rounded edges of airfield guidance sign 220. For example, the rounded edges, in combination with the two surfaces being angled with respect to each other, may turn the approaching air flow of the jet blast and/or wake turbulence force more smoothly than if the edges were sharp (e.g., square), and may also direct a portion of the force imparted by the approaching air flow downward. This may result in a greater pressure equilibrium between the two surfaces of airfield guidance sign 220, which in turn may reduce the pressure difference between the two surfaces. By reducing the pressure differential between first surface 222 and second surface 224 when such a force is applied to one of the surfaces, and by directing a portion of the resultant force downward, the rounded edges of airfield guidance sign 220, in combination with the two surfaces begin angled with respect to each other, can reduce the frequency and/or severity of damage that such forces may cause to the sign as compared with previous airfield guidance signs, in a manner analogous to that previously described in connection with airfield guidance sign 100.

As shown in FIGS. 2A-2B, airfield guidance sign 220 can include a number of support structures (e.g., legs) 240-1, 240-2, 240-3 coupled to the bottom (e.g., the bottom surface) of the sign. Although three support structures are illustrated in FIGS. 2A-2B, embodiments of the present disclosure are not so limited (e.g., airfield guidance sign 220 can include any number of support structures coupled to the bottom of the sign). Further, in some embodiments, airfield guidance sign 220 can include a number of support structures coupled to second surface 224 (e.g., instead of to the bottom of the sign).

In some embodiments, support structures 240-1, 240-2, 240-3 can be spring-loaded support structures. For example, support structures 240-1, 240-2, 240-3 can include a spring that permits airfield guidance sign 220 to tilt when the force applied to first surface 222 or second surface 224 is greater than a particular force (e.g., resulting from the air flow of the jet blast and/or wake turbulence force approaching at a particularly high speed).

For instance, in such embodiments, if a force greater than the particular force is applied to first surface 222, spring-loaded support structures 240-1, 240-2, 240-3 may permit airfield guidance sign 220 to tilt back (e.g., in a counter-clockwise direction in FIG. 2A). Similarly, if a force greater than the particular force is applied to second surface 224, spring-loaded support structures 240-1, 240-2, 240-3 may permit airfield guidance sign 220 to tilt forward (e.g., in a clockwise direction in FIG. 2A).

Figure 3A:
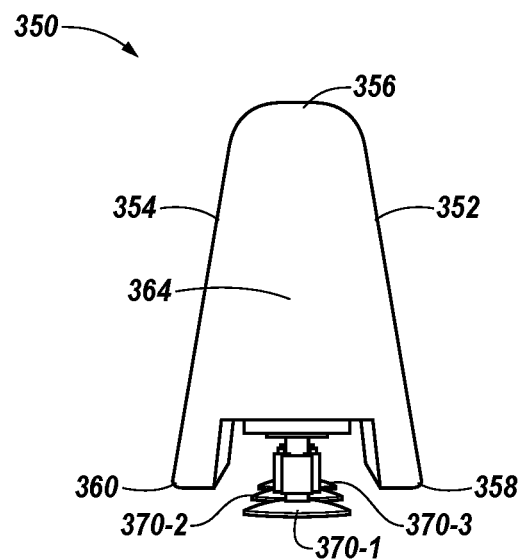
FIGS. 3A-3B illustrate various views of an airfield guidance sign in accordance with one or more embodiments of the present disclosure.
Figure 3B:
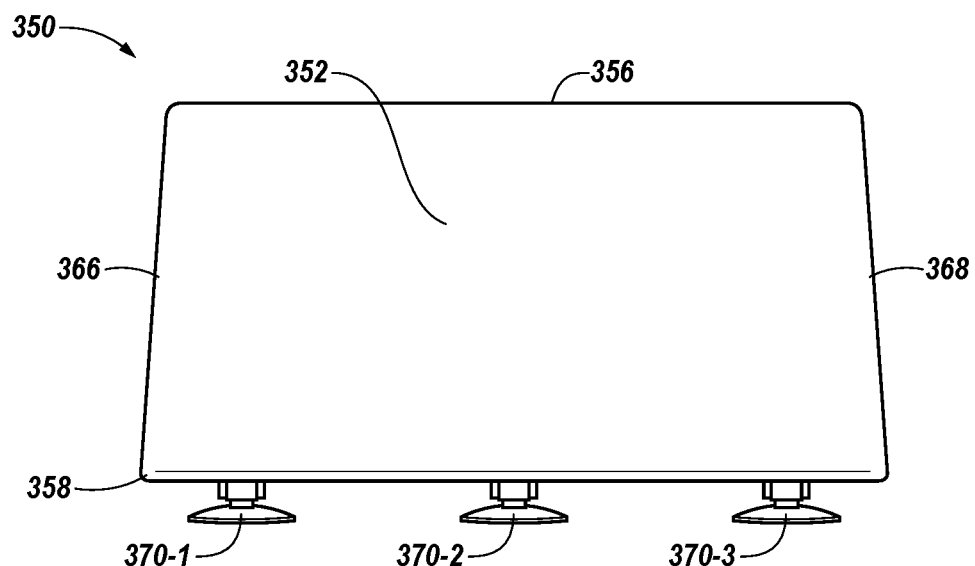

FIGS. 3A-3B illustrate various views of an airfield guidance sign 350 in accordance with one or more embodiments of the present disclosure. For example, FIG. 2A illustrates a side view of airfield guidance sign 350, and FIG. 2B illustrates a front view of airfield guidance sign 350. Airfield guidance sign 350 can be used to direct aircraft ground traffic at an airport, in a manner analogous to airfield guidance sign 100 previously described in connection with FIG. 1.

As shown in FIGS. 3A-3B, airfield guidance sign 350 can include a first (e.g., front) surface 352, and a second (e.g., back) surface 354 angled with respect to first surface 352, in a manner analogous to surfaces 222 and 224 of airfield guidance sign 220 previously described in connection with FIGS. 2A-2B (e,g, at an angle of forty degrees or less). First surface 352 can include navigational information, such as, for instance, numbers, letters, and/or arrows, in a manner analogous to first surface 102 of airfield guidance sign 100 previously described in connection with FIG. 1.

As shown in FIGS. 3A-3B, airfield guidance sign 350 can include a number of (e.g., at least one) rounded edges. For example, in the embodiment illustrated in FIGS. 3A-3B, airfield guidance sign 350 includes rounded edges 356, 358, 360, 366, and 368. Rounded edges 356, 358, 360, 366, and 368 can be analogous to rounded edges 226, 228, 230, 236, and 238, respectively, of airfield guidance sign 220 previously described in connection with FIGS. 2A-2B. For instance, rounded edge 356 can be the top edge of airfield guidance sign 350, rounded edges 358 and 360 can be bottom edges of airfield guidance sign 350, and rounded edges 366 and 368 can be side edges of airfield guidance sign 350, in a manner analogous to that previously described in connection with FIGS. 2A-2B.

Further, the rounded edges of airfield guidance sign 350 can reduce a pressure differential between first surface 352 and second surface 354 when a force, such as, for instance, a jet blast and/or wake turbulence force caused by an aircraft passing by airfield guidance sign 350, is applied to first surface 352 or second surface 354, in a manner analogous to that previously described in connection with FIGS. 2A-2B. This reduced pressure differential can reduce the frequency and/or severity of damage that such forces may cause to the sign as compared with previous airfield guidance signs, in a manner analogous to that previously described in connection with airfield guidance sign 220.

As shown in FIGS. 3A-3B, first surface 352 and second surface 354 of airfield guidance sign 350 can extend further downward than surfaces 222 and 224 of airfield guidance sign 220 previously described in connection with FIGS. 2A-2B, such that the bottom of airfield guidance sign 350 (e.g., the bottom surfaces adjacent rounded bottom edges 358 and 360, respectively) is lower (e.g., closer to the ground) than the bottom of airfield guidance sign 220. Further, each respective bottom surface of airfield guidance sign 350 includes an additional edge opposite its respective rounded bottom edge 358 and 360, as illustrated in FIG. 3A.

As such, a portion of support structures 370-1, 370-1, 370-3 may be covered (e.g., enclosed) by the lower portion of first surface 352 and second surface 354, as illustrated in FIGS. 3A-3B. As shown in FIGS. 3A-3B, airfield guidance sign 350 can include a number of such support structures (e.g., legs) 370-1, 370-2, 370-3 coupled to the sign. Although three support structures are illustrated in FIGS. 3A-3B, embodiments of the present disclosure are not so limited (e.g., airfield guidance sign 350 can include any number of support structures so coupled to the sign). Further, in some embodiments, support structures 370-1, 370-2, 370-3 can be spring-loaded support structures, in a manner analogous to support structures 240-1, 240-2, 240-3 previously described in connection with FIGS. 2A-2B.

FIGS. 4A-4D illustrate a portion of an airfield guidance sign 480 in accordance with one or more embodiments of the present disclosure. For instance, FIGS. 4A-4D may illustrate the top portion of airfield guidance sign 480, as will be further described herein. Airfield guidance sign 480 can be used to direct aircraft ground traffic at an airport, in a manner analogous to airfield guidance sign 100 previously described in connection with FIG. 1.

As shown in FIGS. 4A-4D, airfield guidance sign 480 can include a first surface (e.g., face) 482, and a second surface (e.g., face) 483 opposite (e.g., parallel to) first surface 482. First surface 482 can be, for example, the front (e.g., forward) surface of airfield guidance sign 480, and second surface 483 can be, for example, the back (e.g., aft) surface of airfield guidance sign 480. First surface 482 can include (e.g., display thereon) navigational information, such as, for instance, numbers, letters, and/or arrows, in a manner analogous to first surface 102 of airfield guidance sign 100 previously described in connection with FIG. 1.

As shown in FIGS. 4A-4D, airfield guidance sign 480 can include a surface 484 adjacent first surface 482 and second surface 483. Surface 484 can be, for example, the top surface of airfield guidance sign 480 (e.g., the surface adjacent first surface 482 and second surface 483 at the top of the sign). That is, the portion airfield guidance sign 480 illustrated in FIGS. 4A-4D can be the top portion of the sign.

Top surface 484 can be a rounded surface (e.g., a surface with rounded edges). For instance, top surface 484 is a rounded surface in the embodiment illustrated in FIG. 4D. Alternatively, top surface 484 can have sharp (e.g., square) edges, such as in the embodiments illustrated in FIGS. 4A, 4B, and 4C.

Figure 4A:
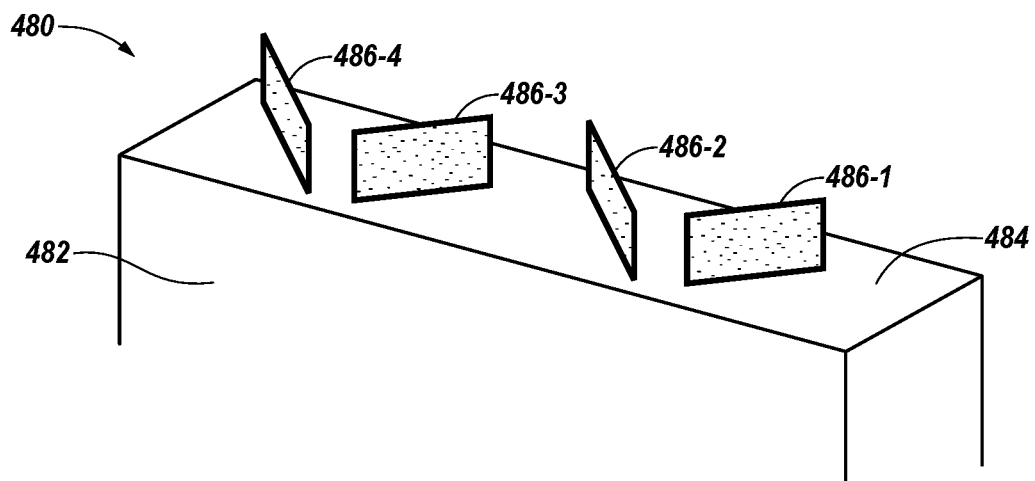
FIGS. 4A-4D illustrate a portion of an airfield guidance sign in accordance with one or more embodiments of the present disclosure.

As shown in FIGS. 4A-4D, airfield guidance sign 480 can include a number of vortex generators coupled to top surface 484. For example, in the embodiment illustrated in FIG. 4A, airfield guidance sign 480 includes vortex generators 486-1, 486-2, 486-3, 486-4 coupled to top surface 484. As shown in FIG. 4A, vortex generators 486-1, 486-2, 486-3, 486-4 are rectangular shaped, and are coupled to airfield guidance sign 480 such that their surfaces are angled with respect to each other and are perpendicular to top surface 484. Although four such vortex generators shown in FIG. 4A, embodiments of the present disclosure are not so limited.

Figure 4B:
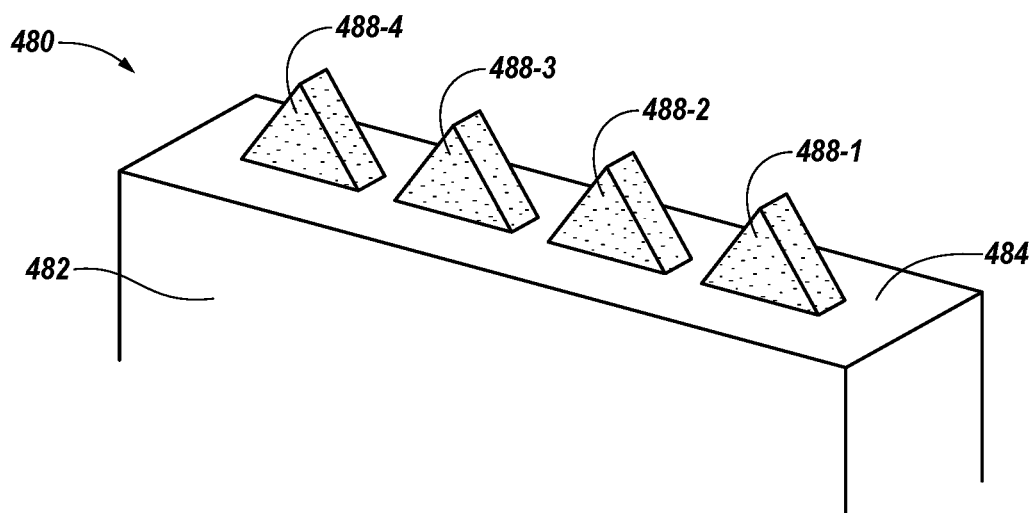

As an additional example, in the embodiment illustrated in FIG. 4B, airfield guidance sign 480 includes vortex generators 488-1, 488-2, 488-3, 488-4 coupled to top surface 484. As shown in FIG. 4B, vortex generators 488-1, 488-2, 488-3, 488-4 are triangular shaped, and are coupled to airfield guidance sign 480 such that their surfaces are in line with respect to each other and are perpendicular to top surface 484. Although four such vortex generators shown in FIG. 4B, embodiments of the present disclosure are not so limited.

Figure 4C:
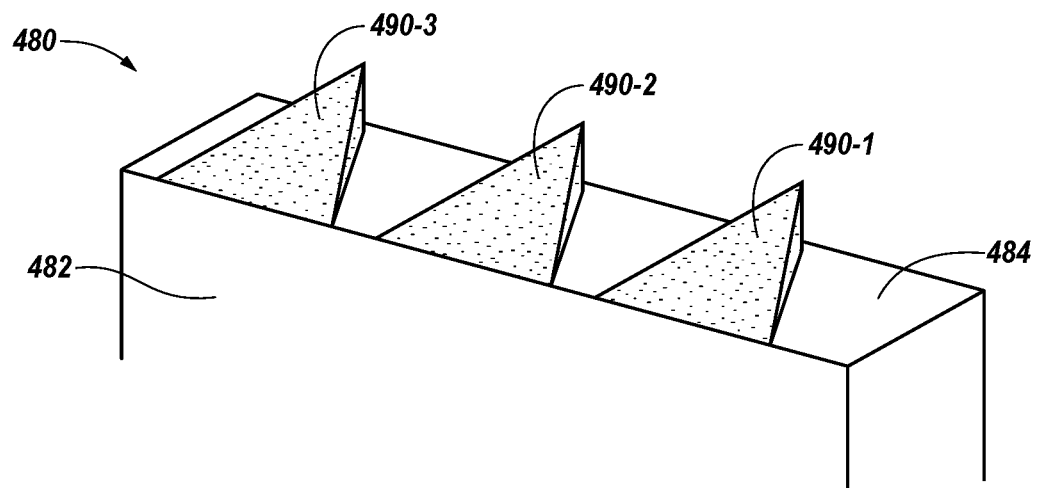

As an additional example, in the embodiment illustrated in FIG. 4C, airfield guidance sign 480 includes vortex generators 490-1, 490-2, 490-3 coupled to top surface 484. As shown in FIG. 4C, vortex generators 490-1, 490-2, 490-3 are triangular shaped, and are coupled to airfield guidance sign 480 such that their surfaces are angled with respect to top surface 484. Although three such vortex generators are shown in FIG. 4C, embodiments of the present disclosure are not so limited.

Figure 4D:
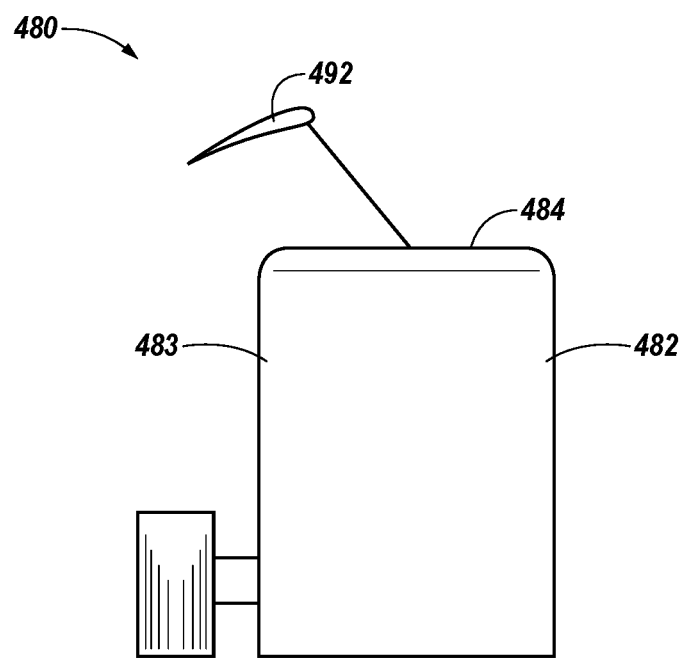

As an additional example, in the embodiment illustrated in FIG. 4D, airfield guidance sign 480 includes turning vane 492 coupled to top surface 484. As shown in FIG. 4D, turning vane 492 is an articulated vane. Although one such turning vane is shown in FIG. 4D, embodiments of the present disclosure are not so limited.

The vortex generators and/or turning vanes of airfield guidance sign 480 (e.g., vortex generators 486-1, 486-2, 486-3, 486-4 illustrated in FIG. 4A, vortex generators 488-1, 488-2, 488-3, 488-4 illustrated in FIG. 4B, vortex generators 490-1, 490-2, 490-3 illustrated in FIG. 4C, and turning vane 492 illustrated in FIG. 4D) can reduce a pressure differential between first surface 482 and second surface 483 when a force, such as, for instance, a jet blast and/or wake turbulence force caused by an aircraft passing by airfield guidance sign 100, is applied to first surface 482. For example, as an aircraft passes by airfield guidance sign 100, the jet blast and/or wake turbulence forces caused by the passing aircraft may apply a high amount of pressure to first surface 482, while a recirculation zone may occur on the opposite side of the sign, which may create a low pressure vacuum on second surface 483. As a result, there may be a pressure difference between the two surfaces when the aircraft passes by the sign.

This pressure differential, however, can be reduced by the vortex generators and/or turning vanes of airfield guidance sign 480. For example, a portion of the jet blast and/or wake turbulence force caused by the passing aircraft may be applied to the surface of each respective vortex generator. As such, the vortex generators may remove some of the slow moving boundary layer of the approaching air flow of the jet blast and/or wake turbulence occurring at top surface 484, which may delay separation of the air flow. This delayed air flow separation may result in a greater pressure equilibrium between surfaces 482 and 483, which in turn may reduce the pressure difference between surfaces 482 and 483. By reducing the pressure differential between first surface 482 and second surface 483 when such a force is applied to first surface 482, the vortex generators of airfield guidance sign 480 can reduce the frequency and/or severity of damage that such forces may cause to the sign as compared with previous airfield guidance signs, in a manner analogous to that previously described in connection with airfield guidance sign 100.

As an additional example, the vortex generators illustrated in FIGS. 4A-4D may be coupled to top edge 106 of airfield guidance sign 100 previously described in connection with FIG. 1, top edge 226 of airfield guidance sign 220 previously described in connection with FIGS. 2A-2B, and/or top edge 356 of airfield guidance sign 350 previously described in connection with FIGS. 3A-3B. Coupling the vortex generators illustrated in FIGS. 4A-4D to the respective top edges of these airfield guidance signs can further reduce the pressure differential between the respective surfaces of these airfield guidance signs, and thereby can further reduce the frequency and/or severity of damage to the signs.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. An airfield guidance sign, comprising:
   a first surface;
   a second surface opposite the first surface;
   a top edge adjacent the first surface and the second surface, wherein the top edge is rounded to reduce a pressure differential between the first surface and the second surface when a force is applied to the first surface or the second surface; and
   a number of support structures coupled to one of the first surface and the second surface but not to the other one of the first surface and the second surface.

2. The airfield guidance sign of claim 1, wherein the airfield guidance sign includes:
  a bottom edge adjacent the first surface and the second surface;
  wherein the bottom edge is rounded to reduce the pressure differential between the first surface and the second surface when the force is applied to the first surface or the second surface.

3. The airfield guidance sign of claim 1, wherein the one of the first surface and the second surface to which the number of support structures are coupled include navigational information.

4. The airfield guidance sign of claim 3, wherein the navigational information includes at least one of:
  letters;
  numbers; and
  arrows.

5. An airfield guidance sign, comprising:
  a first surface;
  a second surface opposite the first surface;
  at least one rounded edge configured to reduce a pressure differential between the first surface and the second surface when a force is applied to the first surface or the second surface; and
  a number of support structures coupled to one of the first surface and the second surface but not to the other one of the first surface and the second surface.

6. The airfield guidance sign of claim 5, wherein the at least one rounded edge includes a top edge of the airfield guidance sign.

7. The airfield guidance sign of claim 5, wherein the at least one rounded edge includes a bottom edge of the airfield guidance sign.

8. The airfield guidance sign of claim 5, wherein the at least one rounded edge includes a side edge of the airfield guidance sign.

9. The airfield guidance sign of claim 5, wherein the at least one rounded edge includes each edge of the airfield guidance sign.

10. The airfield guidance sign of claim 5, wherein the airfield guidance sign includes a top surface adjacent the first surface and the second surface that includes a number of vortex generators coupled thereto.

11. The airfield guidance sign of claim 5, wherein the airfield guidance sign includes a top surface adjacent the first surface and the second surface that includes a number of turning vanes coupled thereto.

* * * * *